Patented July 21, 1936

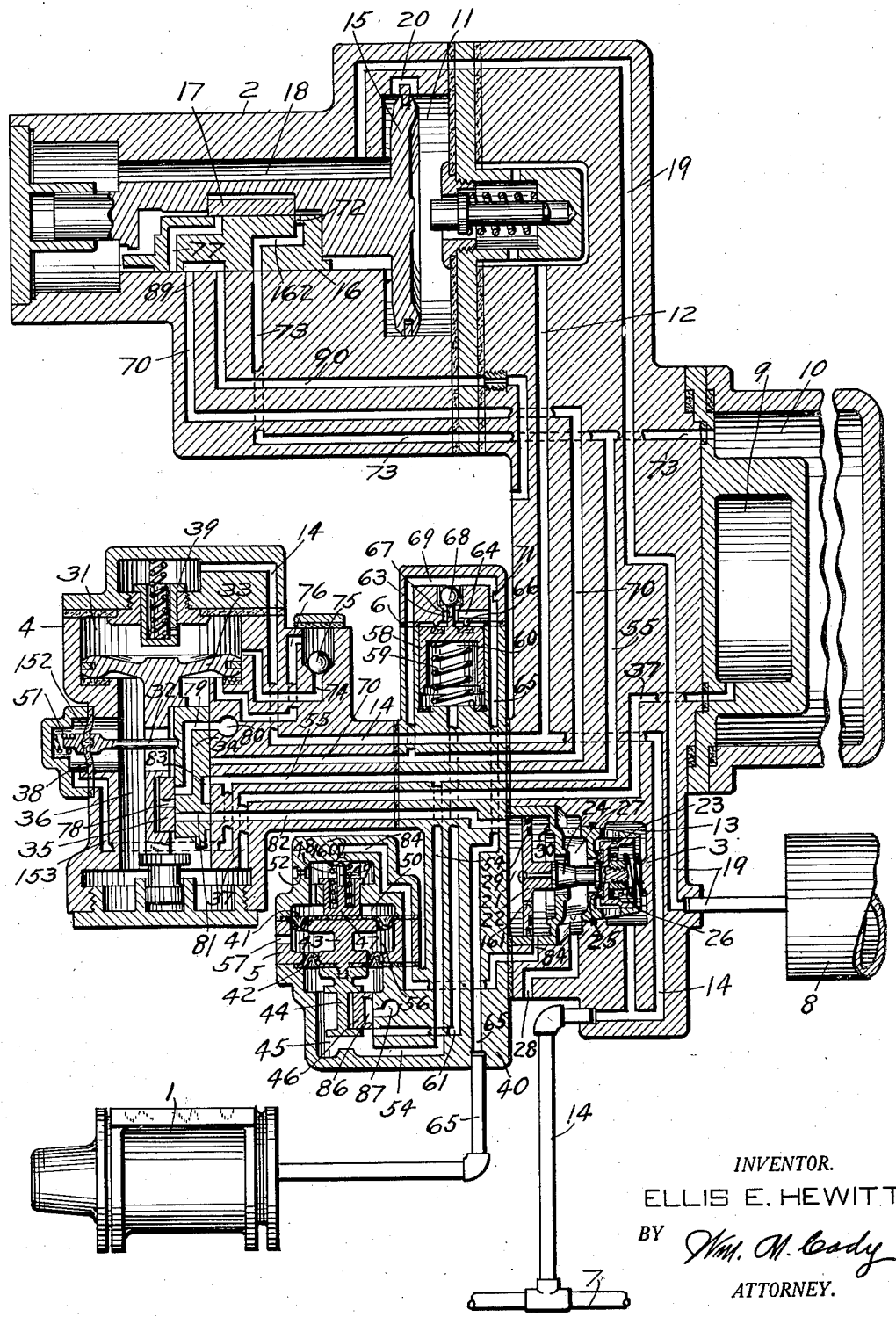

2,048,336

UNITED STATES PATENT OFFICE 2,048,336

FLUID PRESSURE BRAKE

Ellis E. Hewitt, Edgewood, Pa., assignor to The Westinghouse Air Brake Company, Wilmerding, Pa., a corporation of Pennsylvania Application March 22, 1932, Serial No. 600,406

12 Claims. (Cl. 303—46)

This invention relates to fluid pressure brakes and more particularly to the type adapted to operate upon a reduction in pressure in the brake pipe to effect an application of the brakes and upon an increase in brake pipe pressure to effect a release of the brakes.

With the present tendency to increase the number of cars in a train, the difficulty of controlling the brakes, so as not to produce excessive shocks, is correspondingly increased. Such shocks are liable to be produced because the brakes at the front of the train are applied before the brakes at the rear of the train are applied, so that the slack in the train tends to run in toward the front of the train and produce shocks. More severe shocks are occasioned when an emergency application of the brakes is effected than when a service application of the brakes is effected, because in effecting an emergency application of the brakes, the brake cylinder pressure is built up at a faster rate and to a higher degree than in effecting a service application of the brakes.

It has heretofore been proposed to provide a fluid pressure brake equipment having means for slowing down or retarding the rate of build-up of brake cylinder pressure in effecting an emergency application of the brakes during the period that the slack in the train is running in, in order to prevent the slack from running in so harshly as to cause excessive shocks.

An object of the invention is to provide a fluid pressure brake equipment of the above noted type having improved means for varying the rate of brake cylinder pressure build-up during an emergency application of the brakes.

According to the invention, improved and simplified means are provided for supplying an initial inshot of fluid under pressure to the brake cylinder of sufficient degree to move the brake cylinder piston outwardly so as to bring the brake shoes up against the car wheels, followed by a slow build-up of brake cylinder pressure during a time interval of sufficient duration to permit the brakes to be gradually applied throughout the length of the train, so that while the brakes are applied throughout the train, the force of the brake application is not so heavy as to cause severe shocks, which would otherwise occur, due to the running in of the slack at a too rapid rate as before mentioned. After the above mentioned time interval has elapsed, my improved means operates to supply a final inshot of fluid under pressure to the brake cylinder at a more rapid rate to quickly provide the desired high degree of brake cylinder pressure in an emergency application of the brakes.

Another object of the invention is to provide a fluid pressure brake equipment having means for varying the rate of build-up in brake cylinder pressure during an emergency application of the brakes, which means is operative upon charging the equipment with fluid to a pressure exceeding that normally carried, for preventing the variation in the rate of brake cylinder build-up in effecting an emergency reduction in brake pipe pressure.

In my co-pending application for Letters Patent, Serial No. 518,695, filed February 27, 1931, a fluid pressure brake equipment is disclosed employing a brake cylinder, a service application valve device, a quick action valve device, an emergency valve device, an emergency control valve device, an inshot valve device, a brake pipe, an auxiliary reservoir, a quick service action reservoir and an emergency reservoir, the arrangement and connection of the elements constituting the fluid brake equipment being such that certain communications between the quick action reservoir and the atmosphere through which fluid is vented for determining the time of operation of valve mechanism controlling the supply of fluid to the brake cylinder, is controlled by a slide valve in the emergency valve device.

A further object of the invention is to simplify the construction and arrangement of the parts as disclosed in the above noted co-pending application, so as to obviate the necessity for controlling the communication between the quick action reservoir and the atmosphere through the before mentioned slide valve and to thereby render the apparatus less expensive and more effective.

These and other objects that will be made apparent throughout the further description of the invention are attained by means of the fluid brake equipment hereinafter described and illustrated in the accompanying drawing, wherein The single figure is a diagrammatic sectional view of a brake equipment embodying my invention.

Referring to the drawing, the equipment may comprise a brake cylinder 1, a service application valve device 2, a quick action valve device 3, an emergency valve device 4, an emergency control valve device 5, an inshot valve device 6, a brake pipe 7, an auxiliary reservoir 8, a quick action reservoir 9, and an emergency reservoir 10.

The service application valve device 2 may comprise a casing, having a piston chamber 11 connected to the brake pipe 7 through a passage 12 and a passage and pipe 14 and containing a piston 15 adapted to operate a main slide valve 16 and a graduating slide valve 17 contained in a chamber 18 which is connected to the auxiliary reservoir 8 through a passage and pipe 19. With the piston in release position, as shown in the drawing, the piston chamber 11 is connected to the valve chamber 18 through a feed groove 20. Also provided in the casing are the quick action reservoir 9 and the emergency reservoir 10.

The quick action valve device 3 comprises a casing which may be integral with the casing of the service application valve device 2 and has a piston chamber 21 containing a quick action piston 22 to which a brake pipe vent valve 23, contained in the chamber 13, is operatively connected through the medium of a stem 24. The vent valve 23 is normally held seated on an annular seat rib 25 by the pressure of a spring 26 and is operated by the quick action piston to establish communication from the brake pipe to the atmosphere through a chamber 27 and passage 28. The piston 22 is provided with an annular gasket 29, which is adapted to engage a seat rib 30 and provide an air-tight seal between chambers 21 and 27 when the piston 22 is in valve open position.

The emergency valve device may comprise a casing having a piston chamber 31 connected to the brake pipe 7, through a passage and pipe 14 and containing a piston 33, which is adapted to operate a slide valve 34 and an auxiliary slide valve 35 contained in a valve chamber 36 connected to a quick action reservoir 9 through a passage 37. The slide valve 34 is pressed against its seat by a rod 32 carried by the diaphragm 38 that is subject to the pressure of a spring 51 within the chamber 152 and to the pressure of the emergency reservoir 10 which is connected at all times to the chamber 152 through passage 73, passage 55, and passage 153. A spring-pressed stop 39 is provided in the casing and functions to define service position of the emergency piston 33.

The emergency control valve device 5 may comprise a casing which is mounted on a pipe bracket 40 clamped between the casing of the application valve device 2 and the emergency valve device 4. The valve device 5 also comprises spaced diaphragms 41 and 42, which are mounted in the casing, the diaphragm 41 having a greater area than that of the diaphragm 42. A stem 43 is secured to both diaphragms 41 and 42 and at one end has screw-threaded connection with a stem extension 44 contained in a chamber 45 at one side of the diaphragm 42, which extension is adapted to operate a slide valve 46 also contained in the chamber 45.

Contained in a chamber 50 at one side of the flexible diaphragm 41 is a stop member 47 which is subject to the pressure of a spring 48 and which carries a valve 49, the purpose of which will hereinafter appear.

The chamber 45 is connected at all times to the emergency reservoir 10 through the passage 54, passage 55, and passage 73, and consequently the diaphragm 42 is subject to the pressure of the emergency reservoir. The spring-pressed stop 41 normally prevents the stem 43 from moving upwardly beyond the position shown in the drawing when the equipment is charged with fluid to the pressure normally carried for low speed service, say for instance, to seventy pounds. The spring 48 is of such value that when the equipment is charged with fluid at a pressure normally carried for high speed service, say for instance, above eighty pounds, the stem 43 will be moved upwardly against the opposing pressure of the spring, all of which will hereinafter be more fully described.

The diaphragm chamber 50 of the control valve device 5 is open to the atmosphere through a choke passage 52. Between the diaphragms 41 and 42 there is a chamber 56 which is open to the atmosphere through a port 57.

The inshot valve device 6 comprises a casing which is mounted on the pipe bracket 40 and also comprises a valve piston 58 which is operatively mounted in the casing. The valve piston is subject on one side to the pressure of a coil spring 59 contained in a chamber 60, which is connected to a passage 61 leading to the seat of the slide valve 46 of the control valve device 5. The inner seated area of the valve piston is connected to the brake cylinder 1 through a passage 63, a passage 64 and passage and pipe 65. With the valve piston maintained seated on an annular seat rib 66, a projection 67 extending outwardly from the inner seated area of the valve piston maintains a ball valve 68, interposed in the passage 63 unseated, so that the brake cylinder passage 65 and inner seated area of the valve piston are connected past the unseated valve 68 to a passage 69 which opens into a passage 70 leading both to the seat of the application slide valve 16 and the seat of the emergency slide valve 34. The brake cylinder passage 65 is also connected with the passage 69, through a choke passage 71.

In operation, fluid under pressure from the brake pipe 7 flows to the piston chamber 11 of the application valve device by way of pipe and passage 14, and passage 12, forcing the application piston 15 to its innermost position. From the piston chamber 11 fluid under pressure now flows through the feed groove 20 to the valve chamber 18 and from this chamber flows through a passage and pipe 19 to the auxiliary reservoir 8. Fluid under pressure from the valve chamber 18 also flows to the emergency reservoir 10 through a port 162 in the main slide valve 16 having a restricted portion 72, and passage 73, the port 162 being uncovered by the graduating slide valve 17 in the position shown.

Fluid under pressure from the brake pipe 7 is also supplied through the passage 14 to the emergency piston chamber 31 where it acts to force the emergency piston 33 to its innermost position. With the piston 33 in this position, fluid from the piston chamber is supplied to the emergency valve chamber 36 through a passage 74, past a ball check valve 75 and through a passage 76. From the chamber 36 fluid under pressure flows through the passage 37 to the quick action reservoir 9, thus charging it.

Fluid under pressure from the emergency reservoir also flows from passage 73 through passage 55 and passage 54 to the chamber 45 in the emergency controlling valve device 5, where it acts on the flexible diaphragm 42 to force the diaphragm 41 into engagement with the spring stop 47. The pressure of the spring 48 is sufficient to cause the stem 43 and the slide valve 46 to be brought to a stop in the position shown in the drawing, if the pressure at which the emergency reservoir is charged does not exceed the lower degree which is normally employed in low speed service.

From the emergency control valve chamber 45 fluid under pressure flows through passage 61 to the chamber 60 at the spring side of the valve piston 58 of the inshot valve device and with the valve piston in its upper seated position, the ball valve 68 is held unseated.

When it is desired to effect a service application of the brakes, the pressure in the brake pipe 7 and consequently in the piston chamber 11 of the application valve device 2, is reduced in the usual manner. The reduction of pressure in the application piston chamber 11 causes the application piston 15 and consequently the slide valves 16 and 17 to be shifted to service position. With these slide valves in this position, the usual service port 77 in the main slide valve 16 is uncovered and registers with the passage 70 so as to supply fluid under pressure from the valve chamber 18 and auxiliary reservoir 8 to the brake cylinder 1 by way of port 77, passage 70, passage 69, past the unseated ball valve 68, passage 63, passage 64 and passage and pipe 65.

The reduction of pressure in the brake pipe 7 at a service rate, causes the piston 33 of the emergency valve device 4, to be shifted outwardly until it engages the spring-pressed stop 39. The piston, as it is then moved, shifts the auxiliary slide valve 35 to a position in which the valve chamber 36 and consequently the quick action reservoir 9 are connected to the atmosphere by way of a port 78 in the slide valve 35, a port 79 in the slide valve 34, and an atmospheric exhaust port 80.

When the pressure of fluid in the valve chamber 36 and the connected quick action reservoir 9 has been reduced slightly below the pressure in the brake pipe 7 and emergency piston chamber 31, the higher pressure acting on the outer face of the piston 33, will shift the piston to its innermost position, with a consequent movement of the slide valve 35 to release position, thereby preventing movement of the emergency piston 33 to emergency application position.

In effecting a service application of the brakes, the emergency controlling valve device 5 remains in the position shown in the drawing, so that emergency reservoir pressure in chamber 60 of the inshot valve device 6 maintains the valve piston 58 in its upper seated position against the opposing brake cylinder pressure acting on the inner seated area of the valve piston, in which position the projection 67 maintains the ball valve 68 unseated. It will thus be seen that in effecting a service application of the brakes, the inshot valve device will not be caused to operate to restrict the flow of fluid to the brake cylinder.

When an emergency application of the brakes is initiated by effecting a sudden reduction of pressure in the brake pipe 7 and consequently in the piston chamber 11 of the application valve device 2 and in the piston chamber 31 of the emergency valve device 4, the higher pressure in valve chambers 18 and 36 acting on the opposite sides of respective pistons 15 and 33 will shift said pistons to their extreme outer or emergency positions.

The piston 33 in moving to emergency position first shifts the auxiliary slide valve 35 relative to the slide valve 34 and uncovers the port 81 in the slide valve 34 so that the valve chamber 36 and consequently the quick action reservoir 9, are connected to the quick action piston chamber 21 through passage 82, and then shifts both slide valves to emergency position, in which the slide valve 34 uncovers passage 82. Fluid under pressure so supplied from the quick action reservoir to the piston chamber 21 and quick action piston 22 moves the piston 22, so as to unseat the vent valve 23 and vent fluid from the valve chamber 13 and brake pipe 7 to the atmosphere by way of chamber 27, which is open to atmosphere through passage 28, thereby causing quick serial venting of the brake pipe throughout the train. With the quick action piston 22 in its innermost position, the annular packing ring 29 on the inner face of the piston engages the seat rib 30 and provides an air-tight seal, thus preventing escape of fluid under pressure from the chamber 21 to the atmosphere, except through the restricted passage 161 in the piston 22, the purpose of which will hereinafter appear.

With the slide valve 34 of the emergency valve device 4 in emergency position, a cavity 83 in this slide valve connects the passages 55 and 70, and fluid under pressure flows from the emergency reservoir 10 to the brake cylinder 1 by way of passage 73, passage 55, cavity 83, passage 70, passage 69, past the unseated ball valve 68, passages 63 and 64, and passage and pipe 65. At the same time, with the application valve in application position, fluid under pressure also flows from the auxiliary reservoir to the passage 70 through pipe and passage 19, valve chamber 18, and port 77 in the slide valve 16. Pressure of fluid from both reservoirs is also present in valve chamber 45 of the emergency control valve device.

The quick action piston 22, in moving to unseat the valve 23, uncovers a passage 84, so that fluid under pressure supplied from the quick action reservoir 9 to the piston chamber 21 flows to the diaphragm chamber 50 of the emergency control valve device 5 by way of passage 84. Fluid under pressure is vented from the chamber 50 through the choke passage 52 at a slower rate than it is being supplied from the quick action reservoir, so that there will be a build-up of pressure in the chamber 50.

At the same time as the pressure of fluid in the chamber 50 is thus being built up, the pressure of fluid in the valve chamber 45 is reducing, due to the flow of fluid from the emergency reservoir 10 to the brake cylinder 1. When the pressure of fluid in the chamber 50 acting on the upper face of the large diaphragm 41 has been increased to a predetermined degree, say thirty pounds, so as to slightly exceed the pressure reducing in the chamber 45 acting on the under face of the small diaphragm 42, the pressure of fluid in the chamber 50 will cause the diaphragms 41 and 42, stem 43 and stem extension 44, to move downwardly, shifting the slide valve 46 to emergency position. With the slide valve 46 in this position, the chamber 60 at the spring side of the valve piston 58 of the inshot valve device 6 is vented to the atmosphere by way of passage 61, the cavity 86 in the slide valve 46 and an atmospheric exhaust port 87. The quick action piston 22 is in its inner position wherein the passage 84 is open to the chamber 21 of the quick action valve device, and fluid under pressure from the quick action reservoir 9 continues to flow to the diaphragm chamber 50 of the control valve device 5 through passage 84, passage 160 past the pin valve 49.

With the chamber 60 of the inshot valve device thus vented, the pressure of the spring 59 retains the valve piston 58 in its upper seated position, as shown in the drawing, and fluid under pressure continues to flow past the ball valve 68 to the brake cylinder until such time as the brake cylinder pressure is built up to a predetermined degree, say for instance fifteen pounds, Nor when the pressure of fluid thus supplied to the brake cylinder and acting on the inner seated area of the valve piston is sufficient to overcome the opposing pressure of the spring 59, the valve piston will be caused to move downwardly, unseating the valve piston from the seat rib 66.

When the valve piston is thus moved, the ball valve 68, due to the force of gravity, seats and closes the unrestricted communication from the passage 69 through the passage 63. With the ball valve 68 closed, fluid under pressure supplied to the passage 69 from the auxiliary reservoir 8 and emergency reservoir 10 flows to the brake cylinder only at a restricted rate through the choke passage 71, and passage and pipe 65.

At the same time as fluid under pressure is being supplied to the brake cylinder, the fluid under pressure supplied from the quick action reservoir 9 to the chamber 50 of the control valve device 5 is being vented to the atmosphere through the choke passage 52 and the choke passage 161 in the piston 22. When the pressure of fluid in the chamber 50 acting on one side of the large diaphragm 41 is reduced sufficiently that the pressure of fluid in the chamber 45 acting on one side of the small diaphragm 42 is sufficient to overcome the opposing pressure in chamber 50, the diaphragms 41 and 42, stem 43, stem extension 44 and slide valve 46 will be returned to normal position, as shown in the drawing. It will be here noted that the choke passages 161 and 52 so control the flow of fluid from the chamber 50 to the atmosphere that the diaphragms 41 and 42 and associated parts will remain in their lowermost position until a predetermined period of time has elapsed, for instance fifteen seconds, after the ball valve 68 is seated.

When the slide valve is returned to its normal position, fluid under pressure from the valve chamber 45, as supplied from the auxiliary reservoir 8 and emergency reservoir 10, flows through passage 61 to the chamber 60 at the spring side of the valve piston 58. The pressure of fluid thus supplied to the chamber 60 being considerably higher than brake cylinder pressure acting on the opposite side of the valve piston, causes the valve piston to return to its upper seated position, unseating the ball valve 68, so that fluid under pressure is now permitted to again flow to the brake cylinder at the normal rate for the remainder of the emergency application.

After the brake pipe has been vented to the atmosphere, the pressure of fluid in the quick action piston chamber 21 as supplied from the quick action reservoir 9 will have been reduced sufficiently that the pressure of the spring 26 on the vent valve device will cause the vent valve 23 to seat and close communication from the brake pipe to the atmosphere and at the same time cause the quick action piston 22 to move to its outermost position as shown in the drawing. With the piston 22 thus returned to its normal position, communication between the piston chamber 21 and the diaphragm chamber 50 of the control valve device 5 is closed.

When it is desired to release the brakes after an emergency application has been effected, the brake pipe pressure is increased in the usual way, which consequently increases the pressure of fluid in piston chambers 11 and 31 of valve devices 2 and 4 respectively, so that the pistons 15 and 33 of said valve devices are shifted to their innermost or release position. The shifting of the pistons 15 and 33 to their release positions acts to move the respective slide valves 16 and 17, and 34 and 35 to release position.

With the slide valves 16 and 17 of the application valve device 2 in release position, fluid under pressure is released from the brake cylinder 1 by way of pipe and passage 65, passages 64 and 63, past the ball valve 68, passages 69 and 70, a cavity 89 in the slide valve 16 and atmospheric exhaust port 90.

With each of the several devices of the equipment in release position, the equipment is recharged in the same manner as described in connection with the initial charging.

When, in operating a train in high speed service or on a steep descending grade, it is desired to render the control valve device 5 and inshot valve device 6 ineffective to vary the rate of flow of fluid to the brake cylinder in effecting an emergency application of the brakes, the brake pipe pressure is increased above that normally carried. When the pressure of fluid supplied from the brake pipe to the emergency reservoir is increased to a predetermined degree above the pressure normally carried in the reservoir, say to a pressure above eighty pounds, emergency reservoir pressure present in the valve chamber 45 of the control valve device 5, acting on one side of the small diaphragm 42, causes the diaphragms 41 and 42, stem 43, stem extension 44 and slide valve 46 to shift upwardly against the opposing pressure of the spring stop 47 from their normal positions, as shown in the drawing, to emergency cut-out position, wherein the pin valve 49 is seated and closes the port 160, that communicates with the passage 84. The fluid within the chamber 50 will flow to atmosphere through the restricted passage 52 and the slide valve 46 will therefore remain in its upper position so long as the high pressure is maintained on the diaphragm 42.

When the higher pressure is carried in the brake system, as above described, and the brake pipe pressure is reduced at an emergency rate to effect an emergency application of the brakes, the application valve device 2 will move to emergency application position and the emergency valve device will move to emergency position, as hereinbefore described, so that fluid under pressure is supplied to the brake cylinder from the auxiliary reservoir 8 and emergency reservoir 10, past the unseated ball valve 68 of the inshot valve device 6. With the emergency valve device 4 in emergency position, fluid under pressure is supplied from the quick action reservoir 9 to the quick action piston chamber 21 in the same manner as before described, causing the piston 22 to operate to unseat the vent valve 23 and vent fluid under pressure from the brake pipe to the atmosphere as before described. As the piston is moved inwardly it uncovers the passage 84, but since this passage is now closed by the pin valve 49, fluid cannot flow to the chamber 50 to cause operation of the diaphragms 41 and 42 and the slide valve 46.

Since the passage 61 therefore remains connected with the valve chamber 45 of the control valve device, the fluid under pressure supplied from the chamber 45 to the chamber 60 by way of passage 61 will maintain the valve piston 58 in its upper seated position.

Fluid under pressure supplied to the piston chamber 21 from the quick action reservoir 9 flows to the atmosphere through the restricted passage 161 in the piston 22 and reduces the pressure in chamber 21 sufficiently to permit the spring 26 to seat the vent valve 23 and close communication from the brake pipe to the atmosphere.

Summarizing, the fluid brake equipment comprises a triple valve device, an emergency valve device, an emergency control valve device, a quick action valve device and a cut-out valve device so arranged and associated with an auxiliary reservoir, an emergency reservoir, a quick action reservoir and a brake cylinder, that upon a sudden reduction in brake pipe pressure, fluid under pressure is permitted to flow from the emergency and auxiliary reservoirs to the brake cylinder at a relatively fast rate until such time as a predetermined pressure is attained in the brake cylinder and then to operate to retard the rate of flow for a predetermined period of time and finally, after said period of time has elapsed, operate to permit fluid under pressure to again flow to the brake cylinder at a fast rate.

The communicating passage through which fluid is supplied from the auxiliary reservoir and emergency reservoir to the brake cylinder contains a restricted passage having a by-pass passage through which fluid may flow freely around the restricted passage to the brake cylinder at a fast rate, and the by-pass is controlled by a ball check valve that is normally retained in open position by a valve piston of an inshot valve device that is subject at times on opposite sides to the fluid pressures of the auxiliary reservoir and emergency reservoir.

Upon reduction of brake pipe pressure at an emergency rate, the triple or application valve device and the emergency valve device are operated to application and emergency application positions respectively, and open the passages leading from the auxiliary reservoir and emergency reservoir and including the said by-pass. Fluid under pressure is then supplied to the brake cylinder at a fast rate and fluid under pressure is supplied to the fluid operated quick action valve device for effecting its operation to vent the brake pipe to the atmosphere to thereby propagate a quick serial action of the service application and emergency valve devices throughout the train in the manner heretofore described.

Upon movement of the quick action valve device to emergency position, fluid supplied thereto from the quick action reservoir also passes to a chamber on one side of the diaphragm of larger area to the emergency control valve device having a diaphragm of smaller area subjected at all times on one side to the pressure of the emergency reservoir. The said chamber is at all times vented to the atmosphere through a restricted passage which controls the flow of fluid from the chamber to the atmosphere and which determines the time required to build up sufficient pressure within the said chamber to overcome the pressure on the diaphragm of smaller area which is at the same time being reduced due to the delivery of fluid under pressure from the auxiliary reservoir and emergency reservoir to the brake cylinder. When sufficient pressure is built up in the said chamber to overcome that to which the diaphragm of smaller area is subjected, the diaphragms are flexed and move a slide valve which permits fluid on one side of the valve piston to escape to atmosphere. The pressure on the other side of the valve piston then moves it to permit closure of the ball valve controlling the by-pass and to thus prevent flow of fluid to the brake cylinder through the by-pass. Fluid then flows from the auxiliary reservoir and emergency reservoir at a slow rate.

At this time the fluid is vented from the quick action reservoir and the quick action valve device to the atmosphere through a restricted port in the piston of the quick action valve device and from the chamber of the emergency control valve device through a restricted port. When the pressure on the larger diaphragm of the emergency control valve device falls sufficiently, the emergency reservoir pressure on the diaphragm of smaller area will return the diaphragms and the associated slide valves to normal positions determined by a spring stop, thus again subjecting the valve piston of the inshot valve device to emergency reservoir pressure which is sufficient to seat the valve piston and consequently move the ball valve to open position. Fluid under pressure is again supplied from the main and emergency reservoirs at a fast rate during the final stages of the brake application. When the pressure in the fluid operated quick action valve device is reduced sufficiently, communication is closed from the brake pipe to the atmosphere.

When the brake pipe pressure is above the normal pressure carried, as when the train is operating on heavy descending grades, the emergency reservoir pressure on the diaphragm of smaller area of the emergency control valve device overcomes the pressure of the spring stop and flexes the diaphragms so as to cause a pin valve to close communication between the vented chamber of the emergency control valve device and the quick action valve device. Since no fluid under pressure is then supplied to the chamber, pressure can not build up in the chamber and cause movement of the diaphragm of larger area and the slide valve to open communication between the cut-off valve piston and the atmosphere. The valve piston is, therefore, maintained by emergency reservoir pressure at all times during high pressure operation in position to hold the ball valve open, and consequently during operation of the system under high pressure conditions, the inshot valve device is rendered ineffective to change the rate of flow of fluid from the auxiliary reservoir and emergency reservoir to the brake cylinder. The quick action valve device is provided with a vent to atmosphere which permits of sufficient reduction in pressure therein to permit it to close communication from the brake pipe to the atmosphere.

While I have disclosed but one embodiment of the improved fluid brake equipment, it is obvious that changes, additions and omissions may be made in the construction without departing from the spirit of the invention.

Having now described my invention, what I claim as new and desire to secure by Letters Patent, is:

1. In a fluid pressure brake, the combination with a brake pipe, a brake cylinder, and two reservoirs normally charged with fluid under pressure, of a valve device operative to vent fluid under pressure from the brake pipe, valve means operative to vary the rate of flow of fluid under pressure to the brake cylinder, valve mechanism operative to control the operation of said valve means, and an emergency valve device operative upon a sudden reduction in brake pipe pressure for establishing communication through which fluid under pressure is supplied from one of said reservoirs to said brake cylinder to effect an application of the brakes and for establishing communication through which fluid under pressure is supplied from the other of said reservoirs to said valve device to cause the valve device to operate to vent fluid under pressure from the brake pipe to the atmosphere, said valve device in venting position establishing communication through which fluid under pressure flowing thereto from said other reservoir is supplied to said valve mechanism to initiate the controlling operation of the valve mechanism, and means venting fluid under pressure from said other reservoir at a restricted rate for timing the action of said valve mechanism and for permitting said valve device to operate to close communication from the brake pipe to the atmosphere and to close communication from said other reservoir to the valve mechanism, comprising two restricted vents to atmosphere in the communication through which fluid under pressure is supplied from the other reservoir to said valve device and to the said valve mechanism, and means controlled by the valve mechanism for closing communication between one of the vents and the said other reservoir without closing the other vent.

2. In a fluid pressure brake, the combination with a brake pipe, a brake cylinder, and two reservoirs normally charged with fluid under pressure, of a valve device operative to vent fluid under pressure from the brake pipe, valve means operative to vary the rate of flow of fluid under pressure to the brake cylinder, valve mechanism operative to control the operation of said valve means, and an emergency valve device operative upon a sudden reduction in brake pipe pressure for establishing communication through which fluid under pressure is supplied from one of said reservoirs to said brake cylinder to effect an application of the brakes and for establishing communication through which fluid under pressure is supplied from the other of said reservoirs to said valve device to cause the valve device to operate to vent fluid under pressure from the brake pipe to the atmosphere, said valve device in venting position establishing communication through which fluid under pressure flowing thereto from said other reservoir is supplied to said valve mechanism to initiate the controlling operation of the valve mechanism, and means venting fluid under pressure from said other reservoir at a restricted rate for timing the action of said valve mechanism and for permitting said valve device to operate to close communication from the brake pipe to the atmosphere and to close communication from said other reservoir to the valve mechanism, comprising two restricted vents to atmosphere in the communication through which fluid under pressure is supplied from the other reservoir to said valve device and to the said valve mechanism, means controlled by the valve mechanism for closing communication between one of the vents and the said other reservoir without closing the other vent, and means controlled by the valve device for closing the communication between the one vent and the said other reservoir.

3. In a fluid pressure brake, the combination with a brake pipe, a brake cylinder, and two reservoirs normally charged with fluid under pressure, of a valve device operative to vent fluid under pressure from the brake pipe, valve means operative to vary the rate of flow of fluid under pressure to the brake cylinder, valve mechanism operative to control the operation of said valve means, and an emergency valve device operative upon a sudden reduction in brake pipe pressure for establishing communication through which fluid under pressure is supplied from one of said reservoirs to said brake cylinder to effect an application of the brakes and for establishing communication through which fluid under pressure is supplied from the other of said reservoirs to said valve device to cause the valve device to operate to vent fluid under pressure from the brake pipe to the atmosphere, said valve device in venting position establishing communication through which fluid under pressure flowing thereto from said other reservoir is supplied to said valve mechanism to initiate the controlling operation of the valve mechanism, and means venting fluid under pressure from said other reservoir at a restricted rate for timing the action of said valve mechanism and for permitting said valve device to operate to close communication from the brake pipe to the atmosphere and to close communication from said other reservoir to the valve mechanism, comprising two restricted vents to atmosphere in the communication through which fluid under pressure is supplied from the other reservoir to said valve device and to the said valve mechanism, the said valve device being adapted to close communication between one of the vents and the said other reservoir without closing the other vent.

4. In a fluid pressure brake, the combination with a brake pipe, a brake cylinder, and two reservoirs normally charged with fluid under pressure, of a valve device having a valve piston operative to vent fluid under pressure from the brake pipe, valve means operative to vary the rate of flow of fluid under pressure to the brake cylinder, fluid actuated valve mechanism operative to control the operation of said valve means and having a valve for controlling the supply of actuating fluid thereto, and an emergency valve device operative upon a sudden reduction in brake pipe pressure for establishing communication through which fluid under pressure is supplied from one of said reservoirs to said brake cylinder to effect an application of the brakes and for establishing communication through which fluid under pressure is supplied from the other of said reservoirs to said valve device to cause the valve device to operate to vent fluid under pressure from the brake pipe to the atmosphere, said valve device in venting position establishing communication through which fluid under pressure flowing thereto from said other reservoir is supplied to said valve mechanism to initiate the controlling operation of the valve mechanism, and means venting fluid under pressure from said other reservoir at a restricted rate for timing the action of said valve mechanism and for permitting said valve device to operate to close communication from the brake pipe to the atmosphere and close communication from said other reservoir to the valve mechanism, comprising two restricted vents to atmosphere in the communication through which fluid under pressure is supplied from the other reservoir to said valve device and to the said valve mechanism, one of them being through the valve piston of the valve device and the other being controlled by the said valve of the valve mechanism.

5. In a fluid pressure brake, the combination with a brake pipe and a brake cylinder, of a brake controlling valve mechanism operated upon a reduction in brake pipe pressure to cause fluid under pressure to be supplied to the brake cylinder to effect an application of the brakes, a regulating valve operable upon fluid under pressure being supplied to the brake cylinder to first reduce and then increase the rate of flow of fluid under pressure to the brake cylinder, a reservoir normally charged with fluid under pressure, a quick action valve mechanism operative, when effecting an application of the brakes, by fluid under pressure supplied from said reservoir to vent fluid under pressure from the brake pipe and having a restricted port through which fluid under pressure is vented from said reservoir, and a controlling valve device operated by fluid under pressure supplied from said reservoir for controlling the operation of the said regulating valve and having a restricted port through which the fluid under pressure supplied to said controlling valve device from said reservoir is vented.

6. In a fluid pressure brake, the combination with a brake pipe and brake cylinder, of brake controlling valve mechanism operated upon a sudden reduction in brake pipe pressure for supplying fluid under pressure to the brake cylinder to effect application of the brakes, a regulating valve device for controlling the rate at which fluid is supplied to the brake cylinder, a reservoir normally charged with fluid under pressure, a quick action valve device operated, when effecting an application of the brakes, by fluid under pressure supplied from said reservoir to vent fluid from the brake pipe and having a restricted port through which fluid is vented from said reservoir, and a controlling valve device subject to fluid pressure on one side and operated by fluid under pressure supplied to the other side through a communication from said reservoir and including a valve for controlling the operation of said regulating valve device and another valve operable only when the fluid pressure acting on said one side of said controlling valve device exceeds a predetermined amount to so control the communication through which fluid is supplied from said reservoir to said controlling valve device as to render said controlling valve ineffective to control the operation of said regulating valve device.

7. In a fluid pressure brake, the combination with a brake pipe and brake cylinder, of brake controlling valve mechanism operated upon a sudden reduction in brake pipe pressure for supplying fluid under pressure to the brake cylinder to effect application of the brakes, a regulating valve device for controlling the rate at which fluid is supplied to the brake cylinder, a reservoir normally charged with fluid under pressure, a quick action valve device operated when effecting an application of the brakes, by fluid under pressure supplied from said reservoir to vent fluid from the brake pipe and having a restricted port through which fluid is vented from said reservoir, and a controlling valve device subject to fluid pressure on one side and operated by fluid under pressure supplied to the opposite side through a communication from said reservoir and including a valve for controlling the operation of said regulating valve device and another valve operable only when the fluid pressure acting on said one side of said controlling device exceeds a predetermined amount to so control the communication through which fluid is supplied from said reservoir to said controlling valve device as to render said controlling valve ineffective to control the operation of said regulating valve device, said controlling valve device also having a restricted port through which fluid is vented from said reservoir.

8. In a fluid pressure brake, the combination of a brake pipe, a brake cylinder, a first reservoir and a second reservoir normally charged with fluid under pressure, a valve mechanism operative to supply fluid under pressure to said brake cylinder from said first reservoir and thereby effect an application of the brakes upon a reduction in brake pipe pressure, a valve device operative to vary the rate at which fluid is supplied to said brake cylinder, valve means subject to the pressure of fluid from said first reservoir and adapted to be operated by fluid under pressure from said second reservoir for controlling the operation of said valve device, a quick action valve device having a piston adapted to be subjected to the fluid under pressure from said second reservoir and operated thereby, when an application of the brakes is effected, to vent fluid under pressure from said brake pipe to the atmosphere, said valve means being operated, when the pressure of fluid in said first reservoir exceeds a predetermined amount, to a position for rendering said valve device ineffective to vary the rate at which fluid is supplied to the brake cylinder in effecting an application of the brakes, the piston of said quick action valve device having a restricted opening therethrough for venting to atmosphere at a predetermined rate fluid under pressure from said piston when the said valve means is in the last mentioned position.

9. In a fluid pressure brake, the combination of a brake pipe, a brake cylinder, a reservoir normally charged with fluid under pressure, a valve device operative to vary the rate of flow of fluid under pressure to the brake cylinder in effecting an application of the brakes, valve means subject on one side to the pressure of fluid from said reservoir and on the opposite side to the opposing force of a spring, and adapted to be operated when subjected to a varying fluid pressure on the said opposite side for controlling the operation of the said valve device, valve mechanism operated upon a sudden reduction in brake pipe pressure for supplying fluid under pressure from said reservoir to the brake cylinder for effecting an application of the brakes and for supplying fluid under pressure to said opposite side of the valve means, means for varying the pressure of fluid supplied to said opposite side of the valve means, and a valve biased to open position by said spring and adapted to be moved toward and into closed position in response to the operation of said valve means only when the pressure of fluid from said reservoir and acting on said one side of said valve means exceeds a predetermined amount, for rendering said pressure varying means ineffective.

10. In a fluid pressure brake, the combination of a brake pipe, a brake cylinder, a brake controlling valve mechanism operated upon a reduction in brake pipe pressure for supplying fluid under pressure to the brake cylinder to effect application of the brakes, a valve device for varying the rate at which fluid is supplied to the brake cylinder, a first reservoir and a second reservoir both normally charged with fluid under pressure, a quick action valve device operated by fluid under pressure supplied from said first reservoir to vent fluid from the brake pipe when an application of the brakes is effected, and a valve mechanism including a fluid pressure responsive means adapted to be moved in response to the opposing pressures of fluid supplied thereto from said two reservoirs, one valve operably responsive to movement of said fluid pressure responsive means effected when the fluid pressure in said second reservoir is less than a predetermined amount for controlling the operation of said regulating valve device, and a second valve operably responsive only to movement of said fluid pressure responsive means effected when the fluid pressure in said second reservoir is greater than said predetermined amount for so controlling a communication through which fluid from said first reservoir is supplied to said fluid pressure responsive means as to prevent said fluid pressure responsive means from being moved to operate the said one valve to control said regulating valve device.

11. In a fluid pressure brake, the combination with a brake pipe and a brake cylinder, of a brake controlling valve mechanism operated upon a reduction in brake pipe pressure to cause fluid under pressure to be supplied to the brake cylinder to effect an application of the brakes, a regulating valve operable upon fluid under pressure being supplied to the brake cylinder to first reduce and then increase the rate of flow of fluid under pressure to the brake cylinder, a reservoir normally charged with fluid under pressure, a quick action valve operable to vent fluid under pressure from the brake pipe, an abutment movable in response to the pressure of fluid acting on one side thereof and supplied from said reservoir when effecting an application of the brakes, for operating said quick action valve and having a restricted port therein for venting fluid under pressure from the said one side of said abutment, and a controlling valve device operated by variations in the pressure of fluid supplied from said reservoir to effect the operation of said regulating valve.

12. The method of operating a fluid pressure brake having a brake cylinder and a reservoir, consisting in supplying fluid under pressure at a uniform rate for service and emergency applications of the brakes when the reservoir is charged to a pressure higher than a predetermined pressure, and when the reservoir is charged to a pressure less than the predetermined pressure in supplying fluid under pressure to the brake cylinder at a uniform rate for service applications and in supplying fluid under pressure to the brake cylinder at a variable rate for emergency applications.

ELLIS E. HEWITT.

CERTIFICATE OF CORRECTION.

Patent No. 2,048,336.  July 21, 1936.

ELLIS E. HEWITT.

It is hereby certified that error appears in the printed specification of the above numbered patent requiring correction as follows: Page 8, second column, strike out lines 10 to 23 inclusive comprising claim 12; and that the said Letters Patent should be read with this correction therein that the same may conform to the record of the case in the Patent Office.

Signed and sealed this 22nd day of September, A. D. 1936.

Henry Van Arsdale (Seal)  Acting Commissioner of Patents.